US010891527B2

United States Patent
Liu et al.

(10) Patent No.: US 10,891,527 B2
(45) Date of Patent: Jan. 12, 2021

(54) SYSTEMS AND METHODS FOR MULTI-SPECTRAL IMAGE FUSION USING UNROLLED PROJECTED GRADIENT DESCENT AND CONVOLUTINOAL NEURAL NETWORK

(71) Applicant: Mitsubishi Electric Research Laboratories, Inc., Cambridge, MA (US)

(72) Inventors: Dehong Liu, Lexington, MA (US); Suhas Lohit, Tempe, AZ (US); Hassan Mansour, Boston, MA (US); Petros Boufounos, Winchester, MA (US)

(73) Assignee: Mitsubishi Electric Research Laboratories, Inc., Cambridge, MA (US)

( * ) Notice: Subject to any disclaimer, the term of this patent is extended or adjusted under 35 U.S.C. 154(b) by 112 days.

(21) Appl. No.: 16/357,504

(22) Filed: Mar. 19, 2019

(65) Prior Publication Data

US 2020/0302249 A1    Sep. 24, 2020

(51) Int. Cl.
G06K 9/36 (2006.01)
G06K 9/62 (2006.01)
G06N 3/08 (2006.01)
G06N 3/04 (2006.01)
G06T 7/00 (2017.01)

(52) U.S. Cl.
CPC ......... *G06K 9/6289* (2013.01); *G06K 9/6256* (2013.01); *G06N 3/0454* (2013.01); *G06N 3/08* (2013.01); *G06T 7/97* (2017.01); *G06T 2207/10036* (2013.01)

(58) Field of Classification Search
CPC ......... G06T 2207/10036; G06T 2207/10041; G06N 3/0454; G06N 3/08–088
See application file for complete search history.

(56) References Cited

PUBLICATIONS

Charlie Loyd, "Landsat 8 Bands", from the NASA website page titled Landsat Science, downloaded on Sep. 10, 2020 from https://landsat.gsfc.nasa.gov/landsat-8/landsat-8-bands/, pp. 1-7. (Year: 2020).*

(Continued)

*Primary Examiner* — Brian Werner
(74) *Attorney, Agent, or Firm* — Gennadiy Vinokur; James McAleenan; Hironori Tsukamoto

(57) ABSTRACT

Systems, methods and apparatus for image processing for reconstructing a super resolution (SR) image from multi-spectral (MS) images. A processor to iteratively, fuse a MS image with an associated PAN image of the scene. Each iteration includes using a gradient descent (GD) approach with a learned forward operator, to generate an intermediate high-resolution multispectral (IHRMS) image with an increased spatial resolution and a smaller error to the DSRMS image compared to the stored MS image. Project the IHRMS image using a trained convolutional neural network (CNN) to obtain an estimated synthesized high-resolution multispectral (ESHRMS) image, for a first iteration. Use the ESHRMS image and the PAN image, as an input to the GD approach for following iterations. The updated IHRMS image is an input to another trained CNN for the following iterations. After predetermined number of iterations, output the fused high-spatial and high-spectral resolution MS image.

21 Claims, 11 Drawing Sheets

(56) References Cited

PUBLICATIONS

Zhenfeng Shao, "Remote Sensing Image Fusion With Deep Convolutional Neural Network", IEEE Journal of Selected Topics in Applied Earth Observations and Remote Sensing, Vol. 11, No. 5, May 2018, pp. 1656-1669. (Year: 2018).*

Liangpei Zhang et al., "Adjustable Model-Based Fusion Method for Multispectral and Panchromatic Images", IEEE Transactions on Systems, Man, and Cybernetics—Part B: Cybernetics, Vol. 42, No. 6, Dec. 2012, pp. 1693-1704. (Year: 2012).*

\* cited by examiner

| Image Name | Bicubic | Shrinkage Fields [13] | DeepCASD [14] | Unrolled PGD | | | | | |
|---|---|---|---|---|---|---|---|---|---|
| | | | | A = I (reduces to [8]) | | | A is learned | | |
| | | | | Number of Layers | | | Number of Iterations | | |
| | | | | 4 | 12 | 20 | 1 | 3 | 5 |
| Moffett | 32.24 / 0.4788 | 34.21 / 0.6981 | 34.53 / 0.7185 | 37.44 / 0.9710 | 38.20 / 0.9768 | 37.46 / 0.9729 | 37.59 / 0.9708 | 38.52 / 0.9778 | 38.17 / 0.9776 |
| Cambria Fire | 35.52 / 0.5887 | 37.51 / 0.7041 | 37.62 / 0.7087 | 37.83 / 0.9734 | 38.01 / 0.9734 | 38.71 / 0.9696 | 37.90 / 0.9775 | 38.01 / 0.9765 | 39.33 / 0.9771 |
| Cuprite | 32.44 / 0.5060 | 34.33 / 0.7437 | 34.52 / 0.7616 | 36.88 / 0.9750 | 37.56 / 0.9842 | 36.82 / 0.9823 | 37.05 / 0.9734 | 38.56 / 0.9897 | 38.02 / 0.9840 |
| Los Angeles | 27.96 / 0.4888 | 30.39 / 0.7628 | 30.50 / 0.7761 | 36.27 / 0.9702 | 37.38 / 0.9755 | 37.28 / 0.9760 | 36.42 / 0.9712 | 37.79 / 0.9777 | 37.77 / 0.9780 |
| Mean | 31.99 / 0.5156 | 34.11 / 0.7497 | 34.29 / 0.7637 | 37.11 / 0.9760 | 38.03 / 0.9775 | 37.57 / 0.9752 | 37.40 / 0.9746 | 38.45 / 0.9789 | 38.57 / 0.9784 |

(Fusion results comparison)

FIG. 5

SYSTEMS AND METHODS FOR MULTI-SPECTRAL IMAGE FUSION USING UNROLLED PROJECTED GRADIENT DESCENT AND CONVOLUTINOAL NEURAL NETWORK

FIELD

The present disclosure relates generally to multi-spectral imaging, and more particularly to fusing low spatial resolution multi-spectral images with their associated high spatial resolution panchromatic image.

BACKGROUND

Conventional multi-spectral (MS) imaging is widely used in remote sensing and related areas. The bands of interest in MS imaging cover RGB, near infra-red (NIR), and short-wave IR (SWIR), etc. MS imaging provides for discrimination of objects with different material properties which may otherwise be very similar in the RGB bands, and information can be gathered in the presence of harsh atmospheric conditions such as haze and fog, as infra-red waves can travel more easily through these media, as compared to visible light.

Conventional MS sensing presents many interesting challenges. For example, many applications require to have both high spatial and spectral resolutions. However, there is a fundamental trade-off between the bandwidth of the sensor and the spatial resolution of the image. Conventional high spatial resolution is achieved by panchromatic (PAN) image covering the visible RGB bands but without spectral information, while MS images have rich spectral information but with low spatial resolution, which leads to the problem of MS image fusion.

Conventional methods use various techniques to mitigate this hardware limitation and achieve both high spatial and high spectral resolution images. Further, there are many problems with conventional MS image fusion methods. For example, given a set of low resolution MS images obtained at different wavelengths as well as a high resolution panchromatic image which does not have spectral information, the conventional model-based MS image fusion methods may not perform well in achieving both high spectral and high spatial resolutions, while the recent data-driven methods, especially deep-learning based methods, may achieve good performance, but are less interpretable and lack of theoretical convergence guarantee.

The present disclosure addresses the technological needs of today's image processing industries and other related technology industries, by solving the conventional problems of MS image fusion, by producing a set of images that have both high spectral and high spatial resolutions.

SUMMARY

The present disclosure relates to fusing low spatial resolution multi-spectral images with their associated high spatial resolution panchromatic image.

In particular, some embodiments of the present disclosure, use in part signal processing methods for reconstructing a super resolution (SR) multi-spectral (MS) image from low resolution multispectral (MS) images and high resolution panchromatic (PAN) images. Wherein a MS image and a PAN image of a scene are obtained from image sensors, such that each spectral channel of the MS image is associated a spectral band. The image sensors can be MS image sensors and PAN image sensors that are used for taking images of the scene. The MS image obtained from MS image sensor can having a color filter array and positioned at an optical axis, and the PAN image can be obtained from the PAN sensor positioned at the same optical axis such that the MS image sensor and the PAN image sensor cover the same scene of interest.

MS image fusion is essentially an under-determined ill-posed problem. For example, various approaches were experimented with including model-based methods and data-driven methods. The model-based methods generally have theoretical convergence guarantees but with relative poor performance compared to data-driven methods, especially recent deep learning based methods. On the other hand, purely data-driven methods operate as a black box and are hence less interpretable as learned from experimentation. Based on experimentation of model-based deep learning approaches, led the experimentation to a combination of model-based and data-driven solution based on deep learning in order to solve the multi-spectral image fusion problem. For example, unrolling iterations of the projected gradient descent (PGD) algorithm, and then replacing the projection step of PGD with a convolutional neural network (CNN) was discovered as being very effective in solving the multi-spectral image fusion problem.

The fusing of the MS image with an associated PAN image of the scene is using an unrolled iterative process, called unrolled projected gradient descent (PGD) method, wherein each iteration includes two steps. The first step is to use a gradient descent (GD) approach, in order to generate an intermediate high-resolution multi-spectral (HRMS) image that reduces the cost as described in the objective function. The second step is to project the intermediate HRMS image using a convolutional neural network (CNN). The output of CNN is combined with PAN to obtain an estimated synthesized HRMS image, completing the first iteration. For a second iteration and following iterations, this estimated synthesized HRMS image, along with the PAN image, are used as an input to the GD for the iteration, to obtain an updated intermediate HRMS image, which is used as an input to a CNN, same structure of the previous CNN but with different parameters, for the iteration, to obtain an updated estimated synthesized HRMS image by combining the PAN image. Upon completion of all iterations, the updated estimated synthesized HRMS image is the output of the fusion algorithm, which is a fused MS image of high spatial and high spectral resolutions. An output interface can be used to output the fused high-spatial and high-spectral resolution MS image to either a communication network or to a display device.

The number of iterations and parameters in the gradient descent and CNN are determined in the learning process, wherein a set of low-spatial resolution MS images, associate high resolution PAN images, and desired high-spatial resolution MS images are used to learn the parameters. The parameters are learned or adjusted such that the overall error between the final output MS images of the iterative fusion process and the desired high resolution MS images is reduced. The parameters are updated iteratively by the standard random stochastic gradient descent method across all training image sets, until the objective cost function (error) is less than a given threshold or the number of training iterations is greater than a given number.

At least one realization of the present disclosure is developing a signal processing inspired learning solution to the MS image fusion problem, where iterations are unrolled using the gradient descent (GD) algorithm (approach), in combination with a deep convolutional neural network (CNN). An aspect learned through experimentation is that combination of using the GD approach with the CNN provides a new perspective on existing deep-learning solutions, which through experimental results show significant improvements over conventional fusing methods for fusing MS images and PAN images. For example, by non-limiting example, some advantages and benefits include a guaranteed to converge to a meaningful point, as well as provide superior performance when compared to the over conventional fusing methods.

To better understand this ill-posed problem to help figure out solutions, experimentation of the present disclosure experimented with model-based method, purely data-driven approach, and the proposed model-based deep learning method. In regard to the model-based methods for multi-spectral fusion, some experimentation included sparsity in a gradient domain, i.e. total-variation regularization, low-rank models, over-complete dictionary learning with a regularizer on the coefficients. Learned from experimentation is that these methods are generally simple to design and have theoretical guarantees. However, in terms of recovery performance as well as computational complexity during testing, these methods fare poorly compared to purely data-driven methods described next.

In regard to the purely data-driven methods some experimentation included experimenting with deep learning which led to feed-forward non-iterative approaches for solving inverse problems in low-level vision including computational imaging, single-image super-resolution, deblurring and multi-spectral fusion. Learned from experimentation is that these methods are model-agnostic and simply learn a mapping from the measurements to the desired signal in a purely data-driven fashion. When compared to the model-based iterative methods, these methods generally yielded superior results, and were also computationally faster owing to their non-iterative nature (a feed-forward operation at test time) as well as the ease of implementation on Graphics Processing Units (GPUs). However, deep-learning based methods are less interpretable than model based methods.

Learned from experimentation is that in order to bridge the gap between understanding and performance, many of the experimental methods led to combining iterative methods with the deep learning. This was achieved in several ways, for example, using an alternating direction method of multipliers (ADMM), the iterations of ADMM can be unrolled and the projection operator as well as the shrinkage function are learned from data. Learned when using ADMM is that from experimentation, experience shows that the ADMM usually obtains a relatively accurate solution in a handful of iterations.

Some experimentation of the present disclosure included combining Projected Gradient Descent (PGD) with deep learning for the problem of multi-spectral image fusion. Wherein, when unrolling the iterations of PGD such that the projection operator is computed using a trained convolutional neural network (CNN) and all the parameters are learned end-to-end using a training dataset. This problem is different from other inverse problems in two aspects, first, the pan-chromatic (PAN) image is given as a reference image, which acts as important side information, and second, the forward operator A is usually unknown.

Some goals for using the gradient decent (GD) in regard to the present disclosure includes it is guaranteed to reduce the value of the cost function given a suitable value of the learning rate and converge to a solution. However, the solution of GD may be not good according to some quantitative analysis such as peak signal-to-noise ratio (PSNR), depending on the model or the pre-defined cost function. Some goals for using the convolutional neural network (CNN) in regard to the present disclosure includes achieving super performance than pure model-based methods. However, CNN is less interpretable and there is no guarantee for convergence. CNN itself may be very sensitive to interference of inputs. Further, when using CNN, it is possible that there is a need to invoke CNN several times, however, this is not always definitive. However, by using the GD in combination with CNN, there can be controllable outcome.

In other words, by combining GD with CNN, the combination results in solving the MS Fusion problem, both good performance and convergence can be achieved. These goals are very different from the goals of the prior art when using GD and CNN individually. For example, with GD individually, only a converged solution is achieved, but with poor performance in general; With CNN individually, most of the time good performance can be achieved, but the good performance may be degraded a lot by a small interference.

The combination of these two methods are not straightforward, because they are different methods for two different types of problems, GD is a model-based method, CNN is a data-driven method. For example, GD is an iterative method, and CNN is a non-iterative method. How to combine these two methods and retain their advantages in solving MS fusion problem is a very important issue and presents challenges to be overcome which the present disclosure has solved. For example, the GD provides for a controllable guidance toward the fused image, i.e. GD is a model based guidance as indicated by the objective cost function, because GD is computed based on the model of the underlying problem. Whereas the CNN provides for an uncontrollable guidance toward fused image, which is a data-driven guidance, as indicated by the regularization term of our optimization problem, because CNN is designed based on the training data. Together, GD combined with CNN, can have a synergy from a performance and a control point of view. Because the GD and CNN are used together, the output of CNN can be used by GD in a controllable manner to fuse the image, while the output of GD is used by CNN in uncontrollable manner, but because the input to CNN is improved by GD, the output of CNN is also improved, as proven by our experiments.

Although, there can be an appearance by a layman having knowledge in art of neural networks and GD, believing that there may be no need or reason to combine the GD and CNN, since such a layman may think it is a duplication of efforts. However, based upon the realizations of the present disclosure along with the knowledge gained through experimentation, and contrary to the layman's initial thinking of a duplication of efforts, the present disclosure new findings of combining GD with CNN, provide better fusion results together, than if only each were performed separately, as proven by our experiments.

Other advantages and benefits of the present disclosure systems and methods for solving the MS fusion problem can include learning the projection operator CNN with training data. Also an advantage is addressing how to deal with not knowing the forward operator, and how to overcome those challenges when the forward operator is unknown when trying to solve an MS image fusion problem. Further, other advantages and benefits of the present disclosure systems and methods provide for a generalization of existing purely data-driven methods that can assist in providing clarity when solving the MS image fusion problem. For example, when the forward operator is an identity operator and with being able to figure out a set of suitable parameter settings, via the systems and methods of the present disclosure, such results, among many, can be reducing the MS fusion problem to a purely deep-learning based method, among other aspects.

According to an embodiment of the present disclosure, a method for reconstructing a super resolution (SR) image from multispectral (MS) images. The method including accepting data including low resolution multispectral (LRMS) images and high resolution panchromatic (HR-PAN) images of a scene, each LRMS image is associated with each HRPAN image, and storing the data in a memory. Iteratively, fusing a LRMS image with an associated HRPAN image of the scene using a trained fusing algorithm, by a processor. Each iteration includes using a gradient descent (GD) approach, to generate an intermediate high-resolution multispectral (IHRMS) image with an increased spatial resolution when compared to the stored MS image. Projecting the IHRMS image using a convolutional neural network (CNN) to obtain an estimated synthesized high-resolution multispectral (ESHRMS) image. Using the ESHRMS image, along with the HRPAN image, as an input to the GD approach, to obtain an updated IHRMS image for each iteration, which is used as an input to another CNN, to obtain an updated ESHRMS image. Generating a fused high-spatial and high-spectral resolution MS image upon processing all of the accepted LRMS images and HRPAN images of the scene, ending the iterations and completing an iteration cycle. Outputting, via an output interface, the fused high-spatial and high-spectral resolution MS image to a communication network or to a display device.

According to another embodiment of the present disclosure, an apparatus comprising computer storage comprising a computer-readable storage medium. A hardware processor device operatively coupled to the computer storage and to reconstruct spatial resolution of an image of a scene captured within multi-spectral (MS) image and panchromatic (PAN) image. The MS images obtained from a MS image sensor having a color filter array and positioned at a first optical axis, and the PAN images obtained from a PAN image sensor positioned at a second optical axis that is substantially parallel to the first optical axis. Wherein, to reconstruct the spatial resolution of the image, the hardware processor device is to iteratively, fuse a MS image with an associated PAN image of the scene. Each iteration includes using a gradient descent (GD) approach, to generate an intermediate high-resolution multispectral (IHRMS) image with a reduced error according to the objective cost function. Projecting the IHRMS image using a convolutional neural network (CNN) to obtain an estimated synthesized high-resolution multispectral (ESHRMS) image. Using the ESHRMS image, along with the HRPAN image, as an input to the GD approach, to obtain an updated IHRMS image for each iteration, which is used as an input to another CNN, to obtain an updated ESHRMS image. Generating a fused high-spatial and high-spectral resolution MS image upon processing all of the accepted LRMS images and HRPAN images of the scene, ending the iterations and completing an iteration cycle. An output interface outputs the fused high-spatial and high-spectral resolution MS image to one of, a communication network, to a display device or to be stored in the computer-readable storage medium.

According to another embodiment of the present disclosure, a system for reconstructing a super resolution (SR) image from multispectral (MS) images. The system comprising an input interface to accept data. A memory to store the data, the data including MS images and panchromatic (PAN) images of a scene, each MS image is associated with each PAN image. A hardware processing device operatively connected to the input interface and the memory. The hardware processing device is configured to iteratively, fuse a MS image with an associated PAN image of the scene using a trained fusing algorithm, by a processor. Each iteration includes using a gradient descent (GD) approach, to generate an intermediate high-resolution multispectral (IHRMS) image with an increased spatial resolution when compared to the stored MS image. Projecting the IHRMS image using a convolutional neural network (CNN) to obtain an estimated synthesized high-resolution multispectral (ES-HRMS) image. Using the ESHRMS image, along with the HRPAN image, as an input to the GD approach, to obtain an updated IHRMS image for each iteration, which is used as an input to another CNN, to obtain an updated ESHRMS image. Generating a fused high-spatial and high-spectral resolution MS image upon processing all of the accepted LRMS images and HRPAN images of the scene, ending the iterations and completing an iteration cycle. An output interface to output the fused high-spatial and high-spectral resolution MS image to a communication network or to a display device.

BRIEF DESCRIPTION OF THE DRAWINGS

The presently disclosed embodiments will be further explained with reference to the attached drawings. The drawings shown are not necessarily to scale, with emphasis instead generally being placed upon illustrating the principles of the presently disclosed embodiments.

FIG. 5 is a schematic of a table illustrating some experimental results of multi-spectral image fusion in terms of Peak Signal-to-Noise Ratio (PSNR) in decibels (dB) (the top number in each cell) and Structural Similarity Index (SSIM) (the bottom number in each cell) on the test set, according to some embodiments of the present disclosure;

While the above-identified drawings set forth presently disclosed embodiments, other embodiments are also contemplated, as noted in the discussion. This disclosure presents illustrative embodiments by way of representation and not limitation. Numerous other modifications and embodiments can be devised by those skilled in the art which fall within the scope and spirit of the principles of the presently disclosed embodiments.

DETAILED DESCRIPTION

Figure 1A:
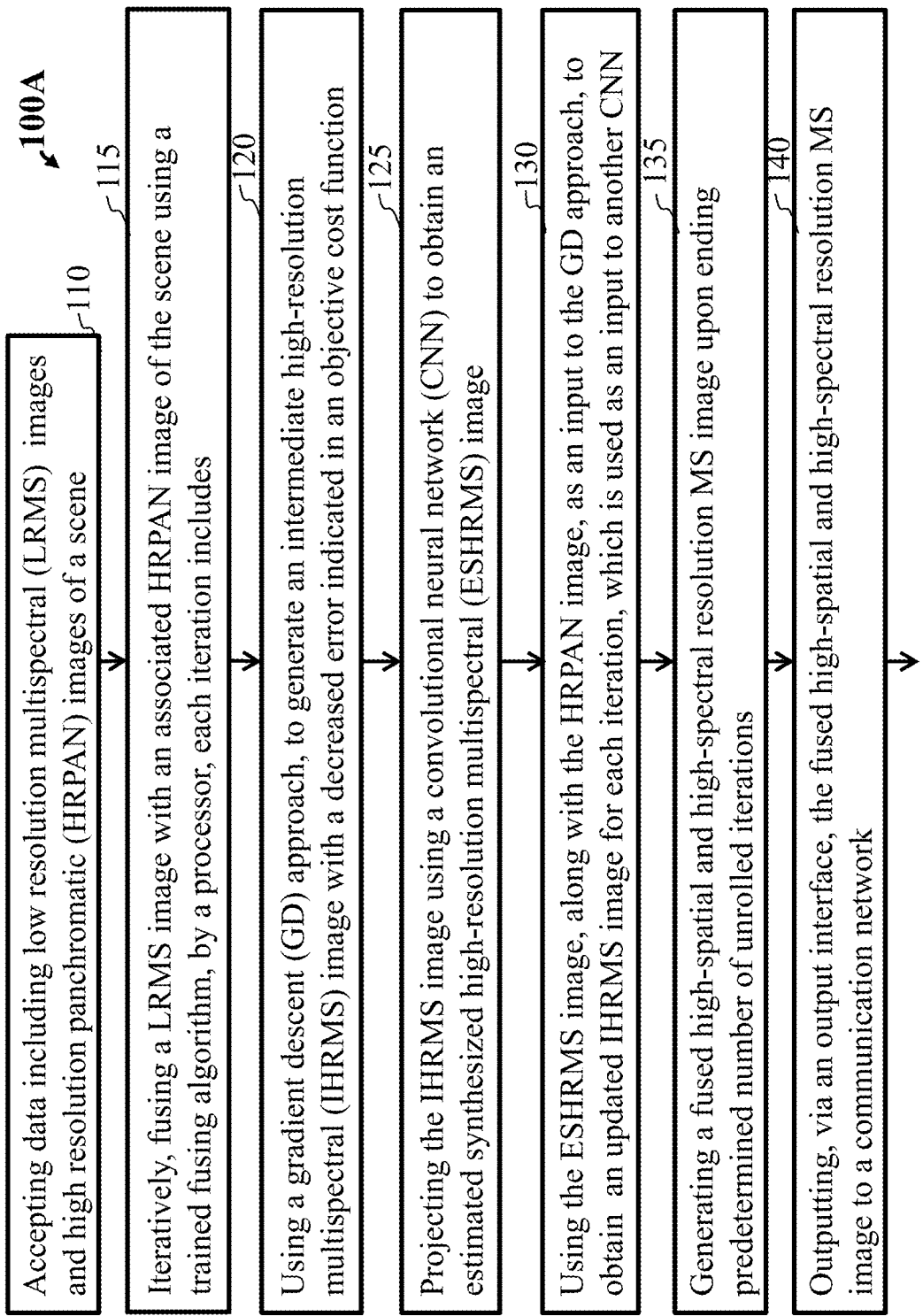
FIG. 1A is a block diagram illustrating a method for image processing for increasing resolution of a multi-spectral image, according to some embodiments of the present disclosure.

FIG. 1A is a block diagram illustrating a method for image processing for increasing resolution of a multi-spectral image, according to some embodiments of the present disclosure.

Step 110 of method 100A can include accepting data via an input interface, the data can include low resolution multi-spectral (LRMS) images and high resolution panchromatic (HRPAN) images of a scene, such that each LRMS image is associated with a HRPAN image.

Further, each LSMS image includes multiple channels, each channel is associated with a frequency band, such that an image of a channel represents the frequency response within the associated frequency band. It is possible the data can be stored in a memory. For example, the data can be stored in one or more databases of a computer readable memory, such that the processor or hardware processor is in communication with the computer readable memory and the input interface or a transceiver.

Step 115 of FIG. 1A can include iteratively, fusing a LRMS image with an associated HRPAN image of the scene using a trained fusing algorithm, by a processor, each iteration can include:

Step 120 of FIG. 1A can include using gradient descent (GD) approach to generate an intermediate high-resolution multispectral (IHRMS) image with a reduced cost according to the objective cost function.

Step 125 of FIG. 1A can include projecting the IHRMS image using a convolutional neural network (CNN) to obtain an estimated synthesized high-resolution multispectral (ES-HRMS) image.

Step 130 of FIG. 1A can include using ESHRMS image and HRPAN image as input to GD approach, to obtain an updated IHRMS image for each iteration, which is used as input to another CNN for updated ESHRMS image.

Step 135 of FIG. 1A can include generating a fused high-spatial and high-spectral resolution MS image upon ending a preset number of unrolled iterations.

Step 140 of FIG. 1A can include outputting via an output interface, the fused high-spatial and high-spectral resolution MS image to one of, a communication network, an external storage device, the memory or to a display device.

Figure 1B:
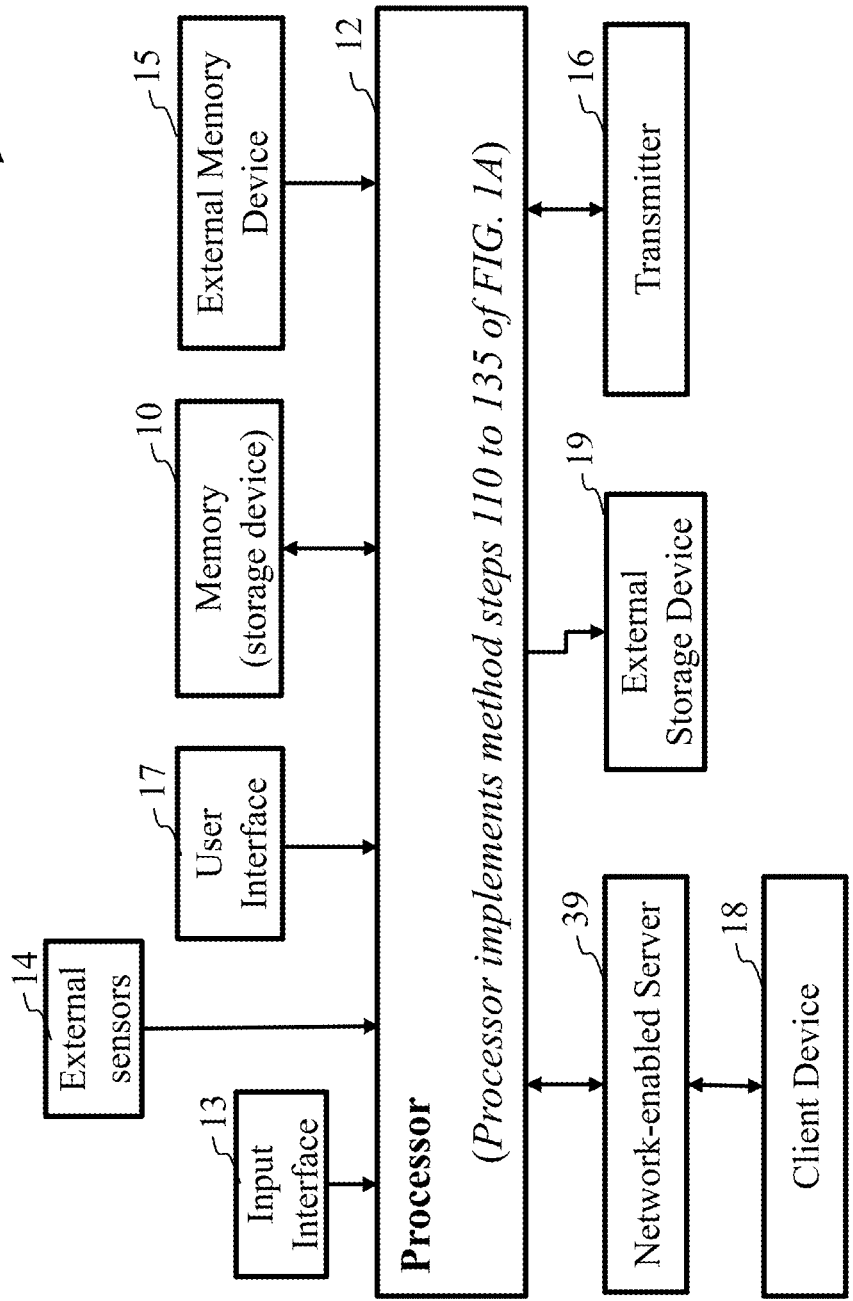
FIG. 1B is a schematic illustrating a method that includes some components that may be used for implementing the method, according to some embodiments of the present disclosure.

FIG. 1B is a schematic illustrating a method that includes some components that may be used for implementing the method 100B, according to some embodiments of the present disclosure. For example, some components can include an input interface 13, a user interface 17, a memory 10 (storage device), an external memory device 15, and a processor 12 (hardware processor) that can implement the steps of the method.

The signal data can include multi-spectral (MS) image data gathered by at least one external sensor 14 and acquired by the input interface 13 or from an external memory device 15, or some other means of communication either wired or wireless. For example, the signal data can be acquired by the processor 12 either directly or indirectly, e.g., a memory transfer device, or a wireless communication like device. It is possible, a user interface 17 having a keyboard (not shown) can be in communication with the processor 12 and a computer readable memory, and can acquire and store the MS and PAN images in the computer readable memory 10 and other data, upon receiving an input from a surface of the keyboard of the user interface 17 by a user.

Still referring to FIG. 1B, the processor 12 can be in communication with a network-enabled server 39, which may be connected to a client device 18. Further, the processor 12 can be connected to a transmitter 16 and an external storage device 19.

Figure 2:
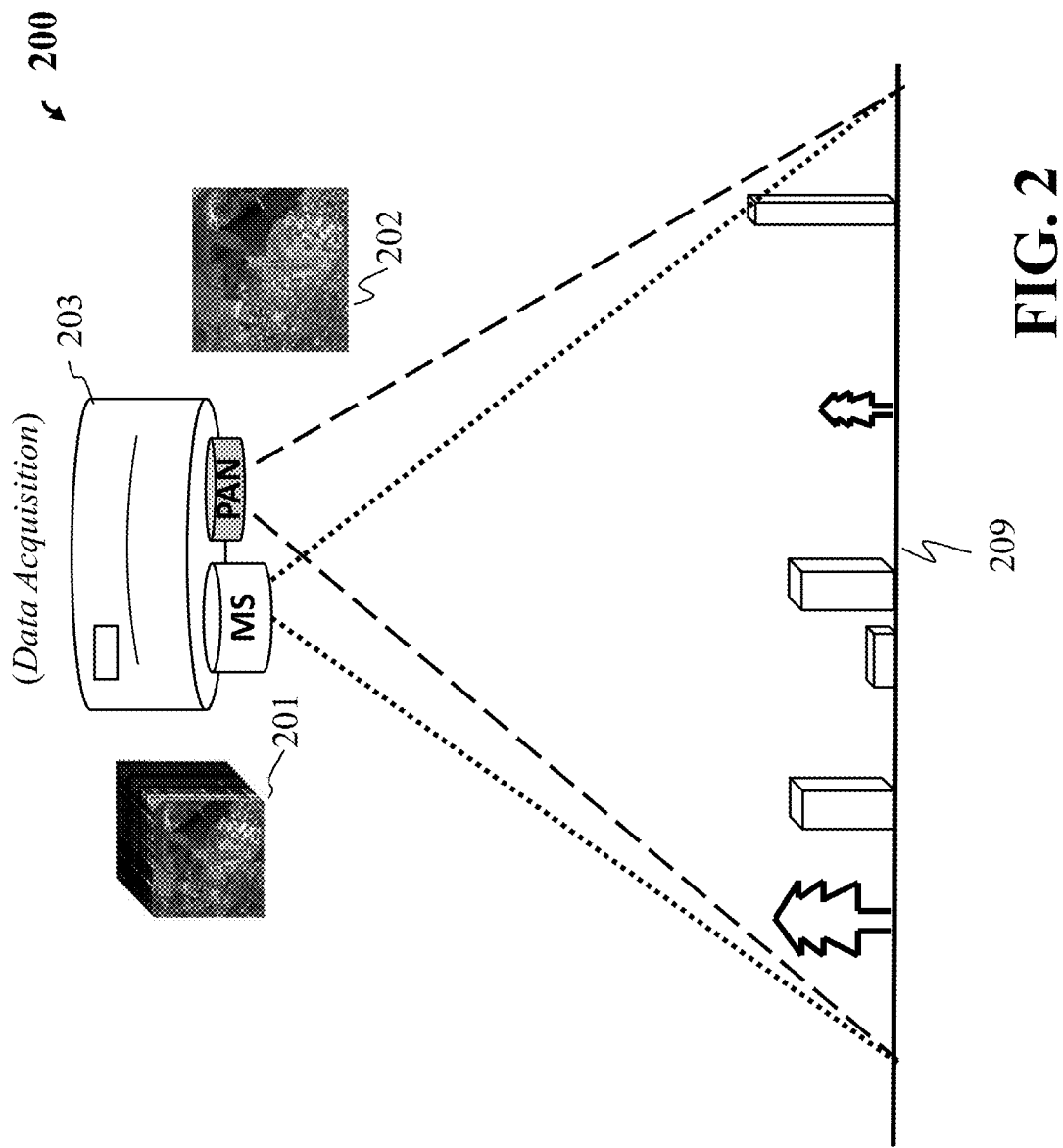
FIG. 2 is a schematic illustrating how the method can collect data for the method, according to some embodiments of the present disclosure.

FIG. 2 is a schematic illustrating how a method 200 can collect data, i.e. multi-spectral (MS) image 201 of a scene 209 and panchromatic (PAN) image 202 of the scene 209, according to some embodiments of the present disclosure. The sensors 203 is capable of multiple sensing features including capturing or collecting data over a wide frequency range beyond the optical bands, including MS images 201 and PAN images 202 of the scene 209. Since infra-red and short-wave infra-red bands can penetrate clouds, the sensors 203 can capture the scene 209 in the infra-red and short-wave infrared bands. Due to the size and weight of MS camera in sensors 203, the resolution of MS image 201 is lower than the PAN image 202.

Figure 3A:
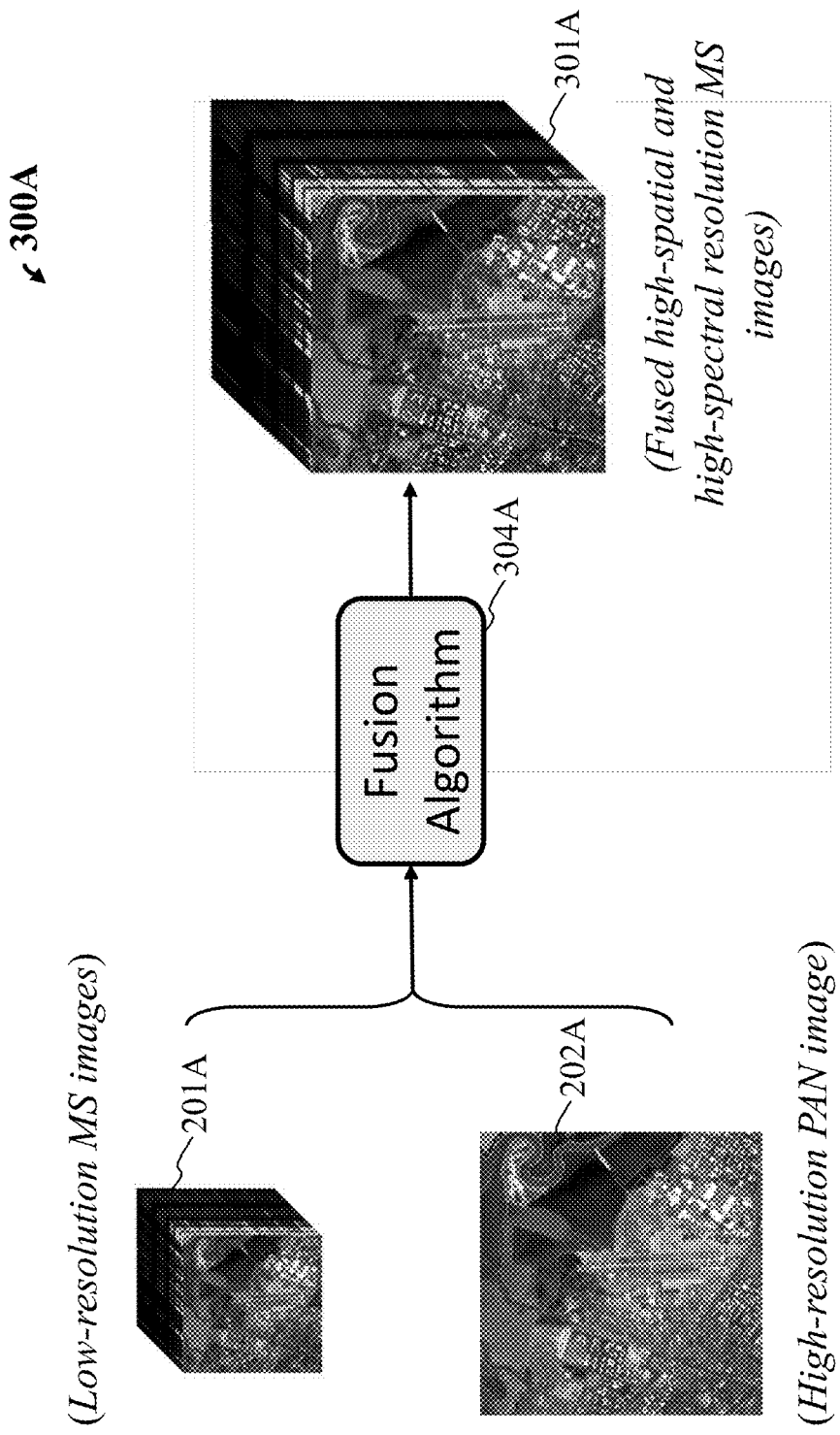
FIG. 3A is a schematic illustrating MS image fusion using a trained fusion system, according to some embodiments of the present disclosure.

FIG. 3A is a schematic illustrating using the trained fusing algorithm having a process 300A that includes using low-resolution Multi-spectral (LRMS) images 201A and high-resolution panchromatic (HRPAN) images 202A to reconstruct fused high-spatial and high-spectral resolution MS images 301A, i.e. super-resolved (SR) multi-channel images, using a fusion algorithm 304A, according to some embodiments of the present disclosure.

Figure 3B:
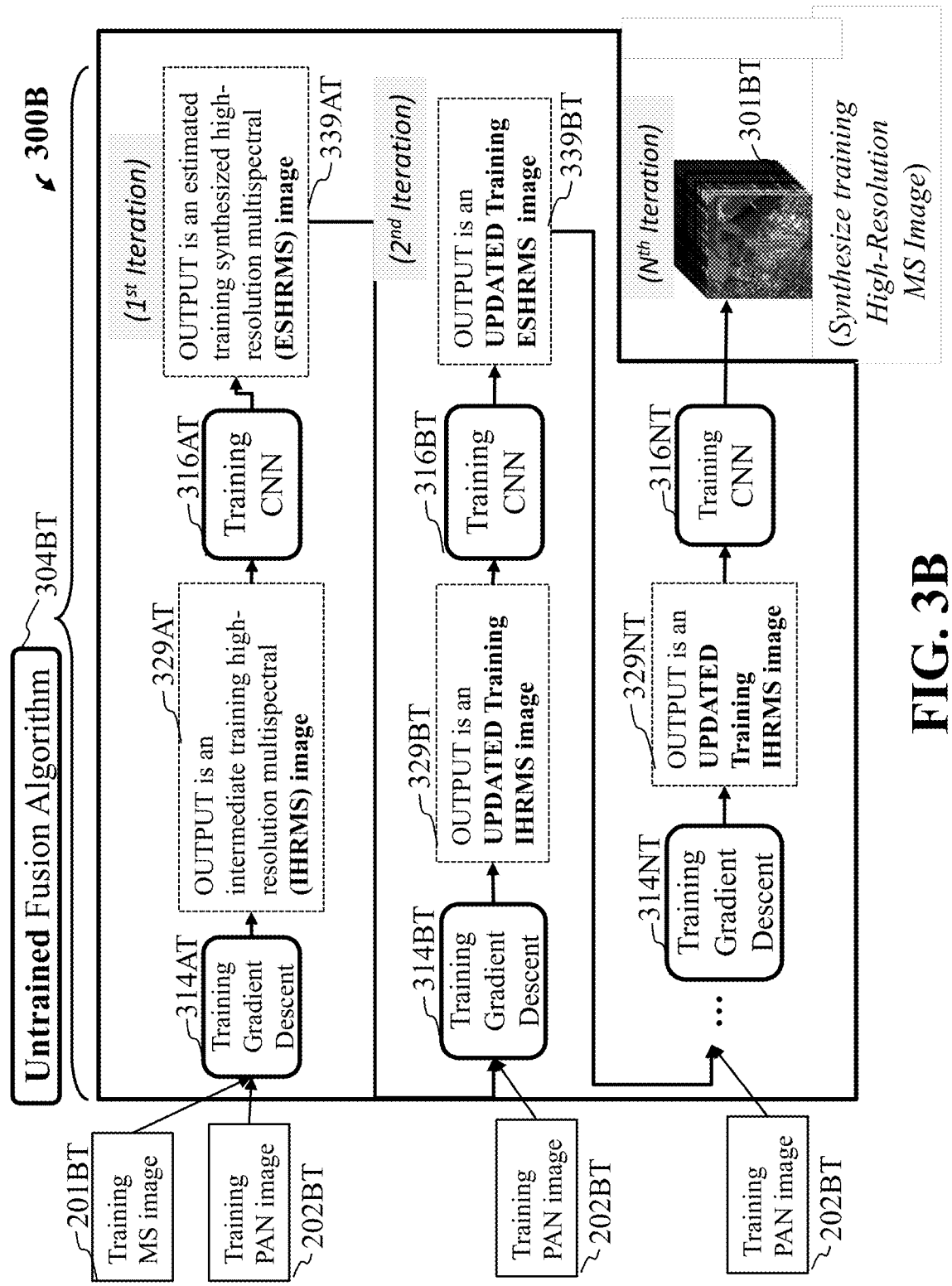
FIG. 3B is a schematic illustrating training an untrained fusing algorithm, that includes using training low resolution MS images and training high resolution PAN images to reconstruct high-resolution MS images, according to some embodiments of the present disclosure.

FIG. 3B is a schematic illustrating training an untrained fusing algorithm 304BT, that includes using training MS images 201BT and training PAN images 202BT to reconstruct high-resolution MS images 301BT, according to some embodiments of the present disclosure. For example, training an untrained fusion algorithm 304BT includes iteratively using a training gradient Descent (GD) approach 314AT, 314BT, . . . , 314NT in combination with a training convolution neural network (CNN) 316AT, 316BT, . . . , 316NT for each training iteration.

Wherein the output of a first training iteration of the training GD 314AT is an intermediate training high-resolution multispectral (IHRMS) image 329AT, which is the input to the training CNN 316AT. The output of the training CNN 316AT is an estimated training synthesized high-resolution multispectral (ESHRMS) image 339AT, which is the input for a second iteration to the training GD 314BT along with the training PAN image 202BT.

Still referring to FIG. 3B, wherein the output of the second training iteration of the training GD 314BT is an UPDATED training IHRMS image 329BT, which is the input for the training CNN 316BT. The output of the training CNN 316BT is an updated training ESHRMS image 339BT, which is the input for an $N^{th}$ training iteration to the training GD 314NT along with the training PAN image 202BT.

Wherein the output of the $N^{th}$ training iteration is to the training GD 314NT that is an UPDATED training IHRMS image 329NT, which is the input for the training CNN 316NT. The output of the training CNN 316NT is a synthesized training high-resolution MS image and completion of the training iterative cycle. Note, each training iteration cycle is completed after processing all training low resolution MS images and training high resolution PAN images of different training scenes.

Still referring to FIG. 3B, the next step in the training of the untrained fusing algorithm, is to determine a training error value indicated in a training objective cost function, after completion of each training iteration cycle, and adjusting parameters of a training GD and parameters of each training CNN of multiple training CNNs, to minimize the training error value for a next training iteration cycle, and ending the training iterations when meeting a training predetermined error threshold, to transform the untrained fusing algorithm, to the trained fusing algorithm. In other words, the untrained fusing algorithm iteratively generates a synthesize training high-resolution MS Image at the completion of each training iteration cycle, over the multiple training iterations.

Figure 3C:
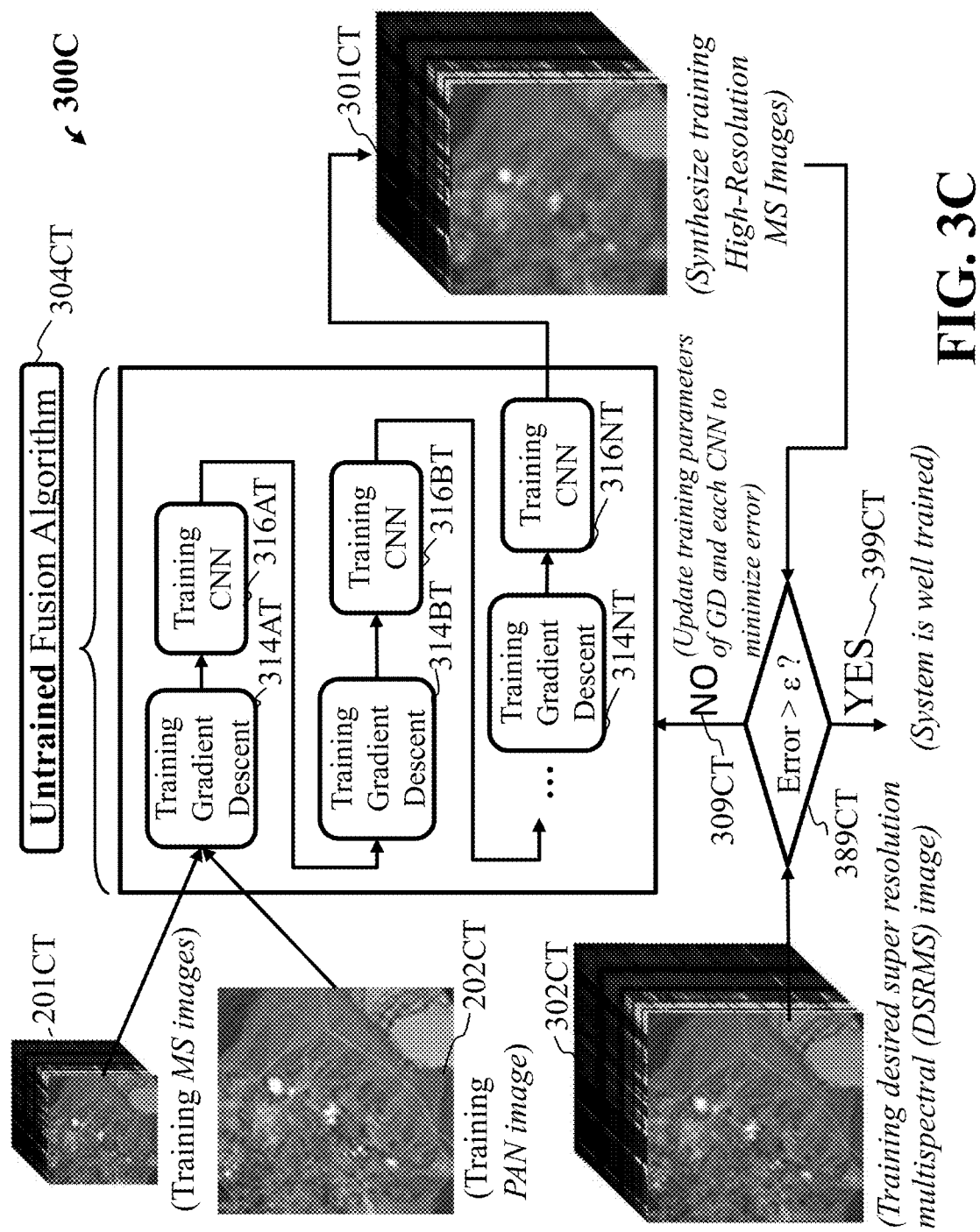
FIG. 3C is a schematic illustrating further training steps for training the untrained fusing algorithm 304BT not discussed in FIG. 3B, that includes adjusting parameters of the training GD and parameters of each training CNN for multiple training CNNs after the completion of each training iteration cycle, to minimize the training error value for a next training iteration cycle, according to some embodiments of the present disclosure.

FIG. 3C is a schematic illustrating further training steps for training the untrained fusing algorithm 304BT not discussed in FIG. 3B, that includes adjusting parameters of the training GD and parameters of each training CNN for multiple training CNNs after the completion of each training iteration cycle, to minimize the training error value for a next training iteration cycle, according to some embodiments of the present disclosure. For example, FIG. 3C discusses training steps, after FIG. 3B iterative steps of using the training GD 314AT, 314BT, . . . , 314NT in combination with the training CNN 316AT, 316BT, . . . , 316NT for each training iteration, to generate the output of the training CNN 316NT, i.e. the synthesize training high-resolution MS Image, at the completion of each training iteration cycle. FIG. 3C uses the synthesize training high-resolution MS Image 301CT at the completion of each training iteration cycle, to determine a training error value 389CT indicated in a training objective cost function, based on comparing between the synthesize training high-resolution MS Image 301CT and a training desired super resolution multispectral image 302CT stored in a training memory. As noted above, each training iteration cycle is completed after processing all training low resolution multispectral images and training high resolution panchromatic images of different training scenes.

Wherein the parameters of the training GD include the forward operator A, and the parameters of the training CNN include a set of filters (also called convolutional kernels or kernels). Further, the training predetermined error threshold can be stored in a training memory, such that an operator can obtain the training predetermined error threshold stored in the training memory. Other aspects of obtaining the predetermined training threshold are contemplated based on known practices.

Still referring to FIG. 3C, in another words, the set of training MS images 201CT and their associate training PAN images 202CT are input to the untrained fusion algorithm 304CT, the output synthesize training high resolution MS images 301CT are compared with the training desired super resolution multispectral (DSRMS) image 302CT, if the error is greater than a predefined small value, i.e. predetermined training threshold, then the parameters of the untrained fusion algorithm 304CT, i.e. parameters for both the training GD and training CNN, are updated to minimize the error, until the error is smaller than the predefined small value, i.e. predetermined training threshold, which means the untrained fusion algorithm 304CT has been transformed to a trained fusion algorithm, i.e. is well trained, or that a number of training iterations is greater than the predefined large value, which means the system is trained long enough time.

Figure 3D:
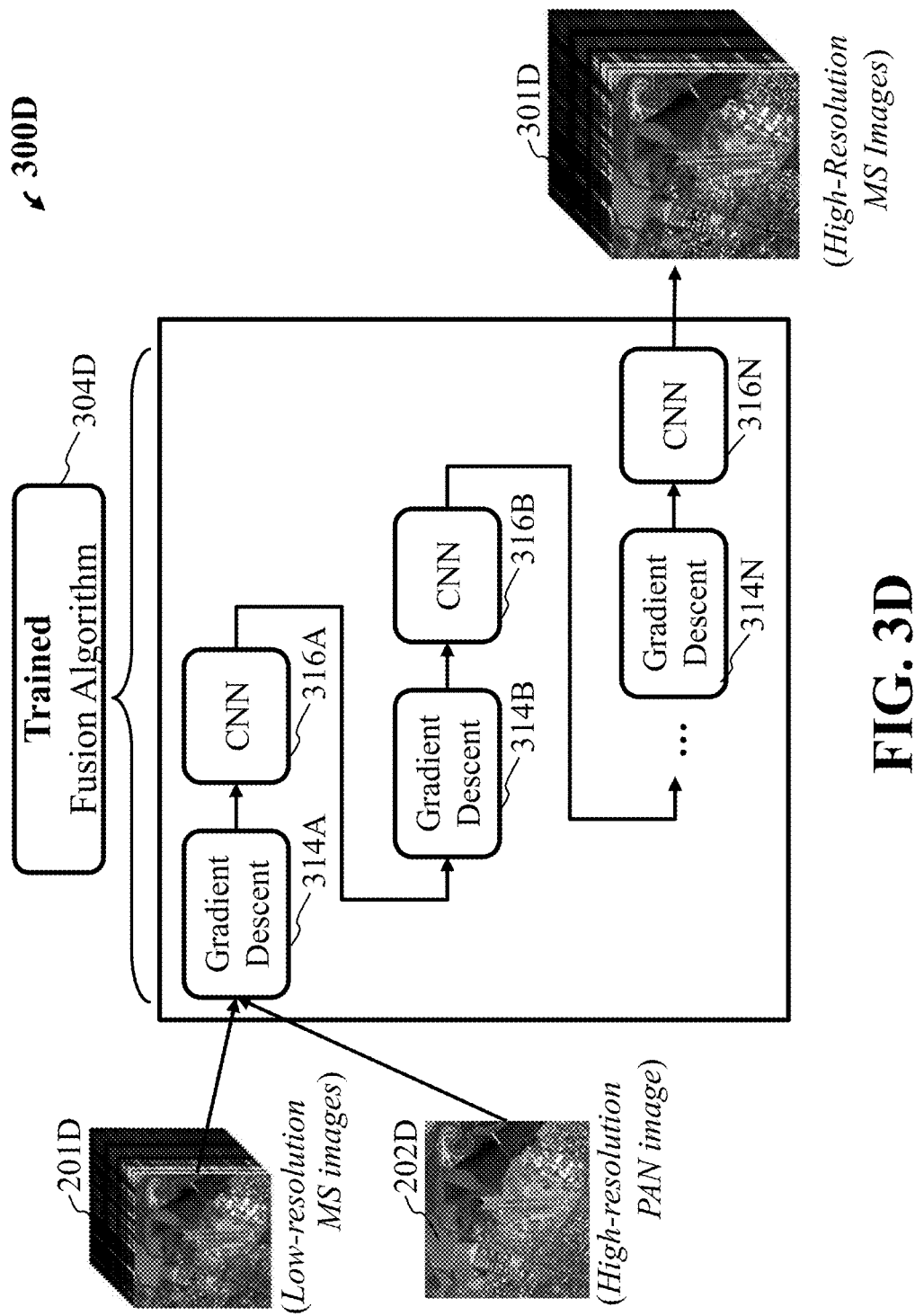
FIG. 3D illustrates using a trained fusing algorithm, according to some embodiments of the present disclosure.

Still referring to FIG. 3C, to even further explain the training processing steps for training an untrained fusing algorithm prior to obtaining the trained fusing algorithm. Some training steps can include:

FIG. 3D illustrates using a trained fusing algorithm, according to embodiments of the present disclosure. For example, accepting data including low resolution multispectral (LRMS) images 201D and high resolution panchromatic (HRPAN) images 202D of a scene, each LRMS image 201D is associated with each HRPAN image 202D, and storing the data in a memory. Iteratively, fusing a LRMS image 201D with an associated HRPAN image 202D of the scene using a trained fusing algorithm 304D, by a processor.

Each iteration includes using a gradient descent (GD) approach 314A, 314B, . . . , 314N to generate an intermediate high-resolution multispectral (IHRMS) image with a decreased error when compared to the stored MS image. Projecting the IHRMS image using a convolutional neural network (CNN) 316A, 316B, . . . , 316N to obtain an estimated synthesized high-resolution multispectral (ES-HRMS) image, which upon several iterations, a fused high-spatial and high-spectral resolution MS image is generated upon processing all of the accepted LRMS images 201D and HRPAN images 202D of the scene, ending the iterations and completing an iteration cycle. Wherein the fused high-spatial and high-spectral resolution MS image 301D can be outputted to a communication network or to a display device.

Figure 4:
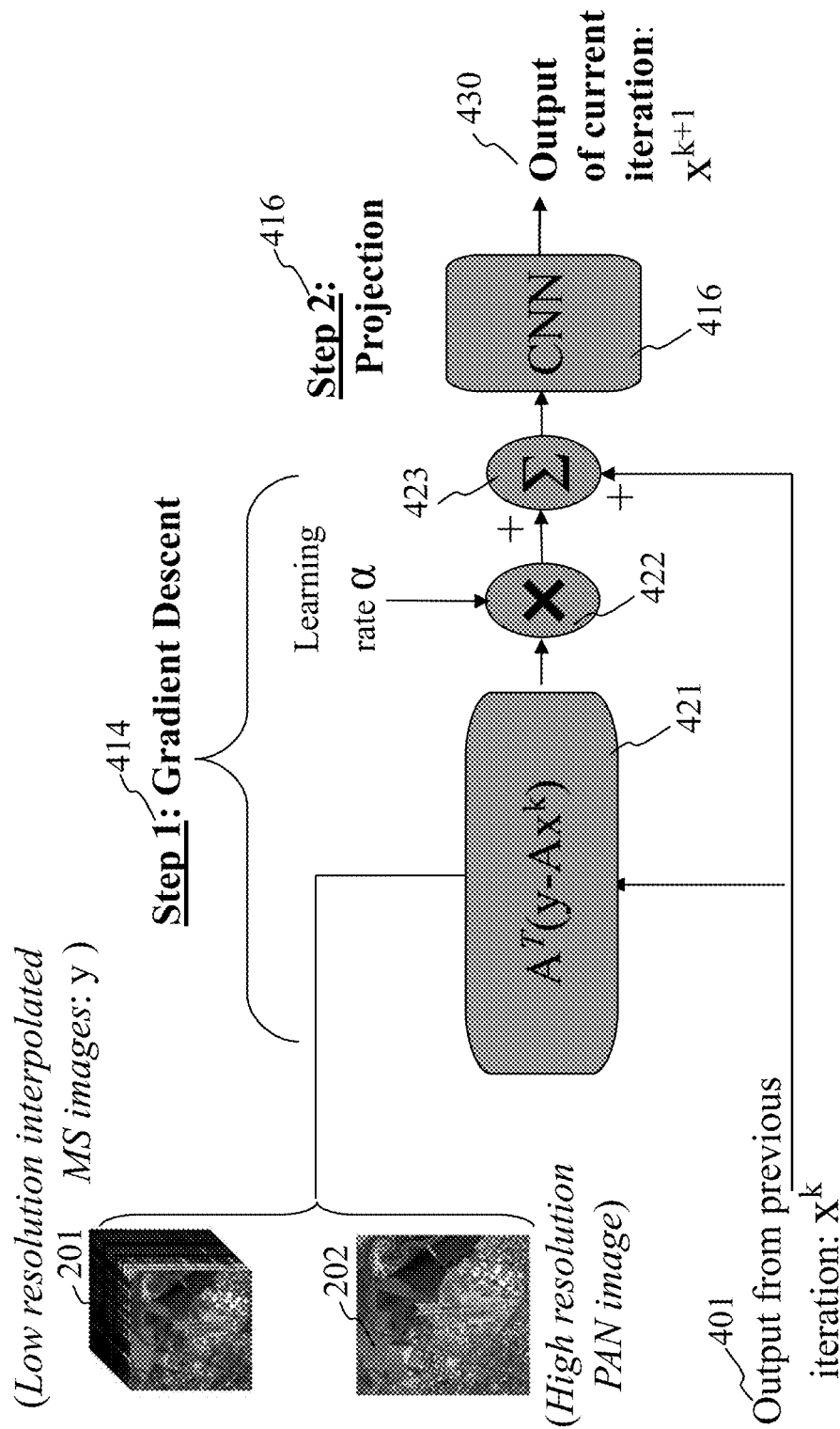
FIG. 4 is a schematic illustrating some steps of at least one method, the first step is a gradient descent step and a second step includes using the CNN as the projection operator onto an estimated set of high resolution multispectral images, wherein both forward operator A and convolutional layers in the CNN are learned end-to-end jointly, according to some embodiments of the present disclosure.
Figures 6A, 6B, 6C, 6D, 6E, 6F:
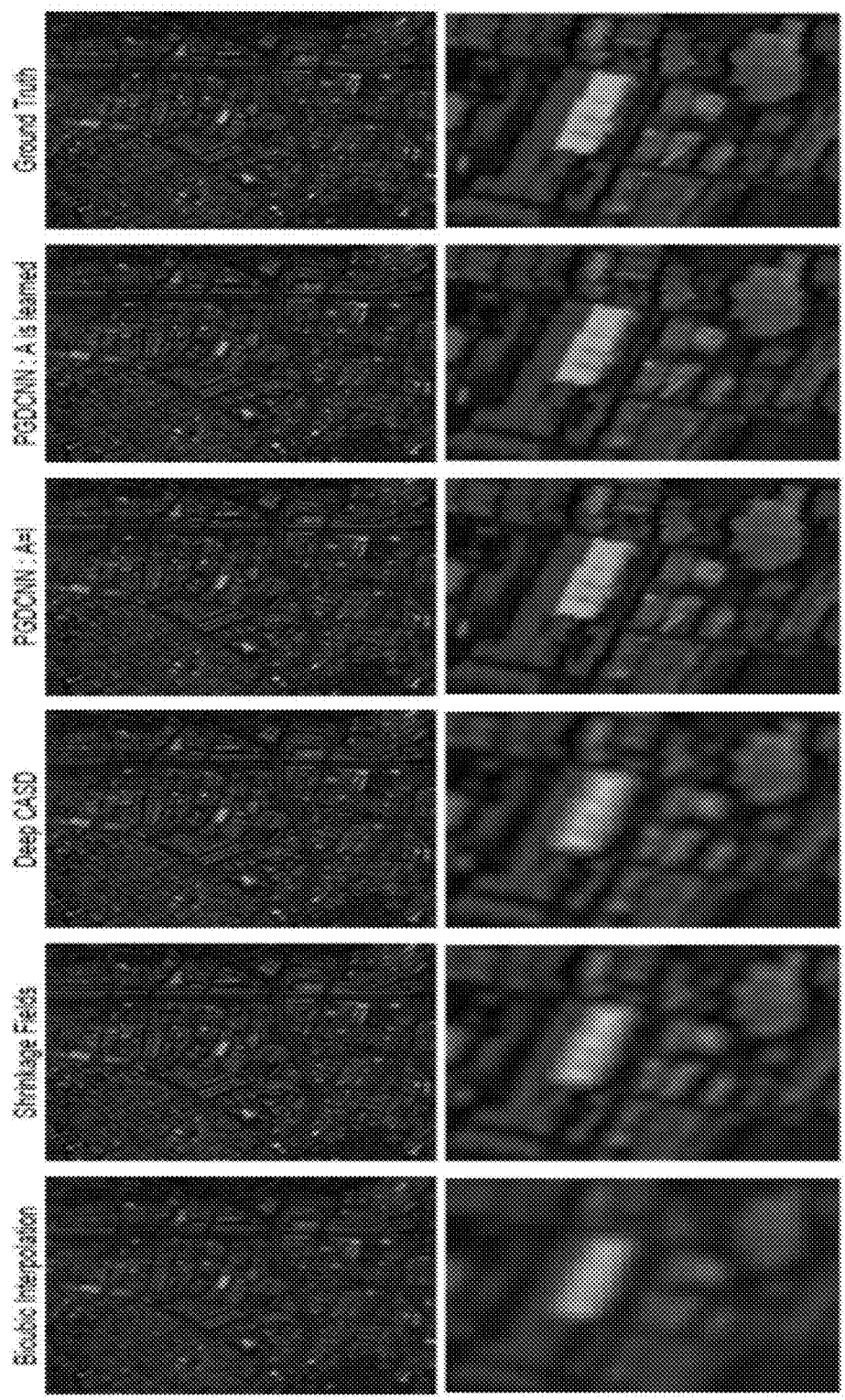
FIGS. 6A, 6B, 6C, 6D, 6E and 6F are pictures illustrating example images from experimentation, that show the visual comparison of results for a "Los Angeles" image (top row) and zoomed in portions (bottom row), according to some embodiments of the present disclosure.

FIG. 4 is a schematic illustrating some steps of at least one method, the first step is a gradient descent step and a second step includes using the CNN as the projection operator onto an estimated set of high resolution multispectral images, wherein both forward operator A and layers in the CNN are learned end-to-end jointly, according to embodiments of the present disclosure.

We denote y an image set including interpolated low-resolution MS image and high resolution PAN, x an image set including desired high-resolution MS image and high resolution PAN image. The forward operator A is an unknown mapping process which maps desired high resolution image set x to low resolution image set y. Given the output $x^k$ of $k^{th}$ iteration, the gradient at $x^k$ is computed mathematically by process 421. The $(k+1)^{th}$ iteration output of the gradient descent step 414 is achieved by adding in process 423 the $k^{th}$ iteration output $x^k$ with a gradient image, which gradient image is computed by multiplying the gradient in 421 with step size a in the process 422.

FIG. 5 is a schematic of a table illustrating some experimental results of multi-spectral image fusion using different methods, including traditional bicubic interpolation method, model-based method Shinkage Fields, learning-based method DeepCASD, and our proposed unrolled PGD method. When A=I, the PGD method is a pure deep-learning method.

FIGS. 6A, 6B, 6C, 6D, 6E and 6F are pictures illustrating example images from experimentation, that show the visual comparison of results for a "Los Angeles" image (top row) and zoomed in portions (bottom row), using different methods, including traditional bicubic interpolation method, model-based method Shinkage Fields, learning-based method DeepCASD, and our proposed unrolled PGD method. When A=I, the PGD method is a pure deep-learning method, according to embodiments of the present disclosure.

Features

Contemplated is that the system, can include any combination of the different aspects listed below, regarding the method, described as a method for reconstructing a super resolution (SR) image from multispectral (MS) images. The method including accepting data including low resolution multispectral (LRMS) images and high resolution panchromatic (HRPAN) images of a scene, each LRMS image is associated with each HRPAN image, and storing the data in a memory. Iteratively, fusing a LRMS image with an associated HRPAN image of the scene using a trained fusing algorithm, by a processor. Each iteration includes using a gradient descent (GD) approach, to generate an intermediate high-resolution multispectral (IHRMS) image with an increased spatial resolution when compared to the stored MS image. Projecting the IHRMS image using a convolutional neural network (CNN) to obtain an estimated synthesized high-resolution multispectral (ESHRMS) image. Using the ESHRMS image, along with the HRPAN image, as an input to the GD approach, to obtain an updated IHRMS image for each iteration, which is used as an input to the CNN, to obtain an updated ESHRMS image. Generating a fused high-spatial and high-spectral resolution MS image upon processing all of the accepted LRMS images and HRPAN images of the scene, ending the iterations and completing an iteration cycle. Outputting, via an output interface, the fused high-spatial and high-spectral resolution MS image to a communication network or to a display device.

An aspect includes training of an untrained fusing algorithm prior to obtaining the trained fusing algorithm, includes determining a training error value indicated in a training objective cost function, upon completion of each training iteration cycle. Comparing the training error value to a training predetermined error threshold, if the training error value meets the training predetermined error threshold, the untrained fusing algorithm is transformed to the trained fusing algorithm, if the training error value does not meet the training predetermined error threshold. Then, adjusting parameters of a training GD (TGD) and parameters of multiple training CNNs (TCNNs) of the training fusing algorithm. Wherein parameters for each TCNN of the multiple TCCNs are different, such that adjusted parameters of the TGD and each of the multiple TCNNs are to minimize the training error value, for that iteration cycle.

Another aspect includes training an untrained fusing algorithm prior to obtaining the trained fusing algorithm, includes determining a training error value indicated in a training objective cost function, after completion of each training iteration cycle, and adjusting parameters of a training GD and parameters of a training CNN, of the training fusing algorithm, to minimize the training error value for a next iteration cycle, and ending the training iterations when meeting a training predetermined error threshold, to transform the untrained fusing algorithm to the trained fusing algorithm.

Another aspect includes the training error value is determined based on comparing between a training fused high-spatial and high-spectral resolution multispectral image and a training desired super resolution multispectral image stored in a training memory. Another aspect includes a training iteration cycle is completed after processing all training low resolution multispectral images and training high resolution panchromatic images of a training scene.

Another aspect includes the parameters of the GD include the forward operator A, and the parameters of the CNN include a set of filters, such as a set of convolutional kernels. Another aspect includes the training predetermined error threshold is stored in a training memory, such that an operator obtains the training predetermined error threshold stored in the training memory.

Another aspect includes training an untrained fusing algorithm prior to obtaining the trained fusing algorithm, includes the steps of: accepting training data in a training memory, the training data including at least one training desired super resolution multispectral (TDSRMS) image, training low resolution multispectral (TLRMS) images and training high resolution panchromatic (THRPAN) images of a training scene, each TLRMS image is associated with each THRPAN image; iteratively, fusing a TLRMS image with an associated THRPAN image of the training scene using an untrained fusing algorithm, by a training processor, each training iteration including: using a training gradient descent (TGD) approach, to generate a training intermediate high-resolution multispectral (TIHRMS) image that has an increased spatial resolution, and a smaller error to the TDSRMS image when compared to the stored TLRMS image; projecting the TIHRMS image using a training convolutional neural network (TCNN) to obtain an training estimated synthesized high-resolution multispectral (TESHRMS) image, for a first iteration; using the TESHRMS image, along with the THRPAN image, as an input to the TGD approach for a second iteration and following iterations, to obtain an updated TIHRMS image, which is used as an input to the TCNN for the iteration and following iterations, to obtain an updated TESHRMS image; generating a training fused high-spatial and high-spectral resolution multispectral image upon processing all of all the TLRMS images and THRPAN images of the scene; determining an error between the training fused high-spatial and high-spectral resolution multispectral image and the stored DSRMS image, to obtain a training error value; comparing the training error value to a training predetermined error threshold, if the training error value meets the training predetermined error threshold, the untrained fusing algorithm is transformed to the trained fusing algorithm, if the training error value does not meet the training predetermined error threshold, then parameters of the TGD and TCNN are updated to minimize the training error value, for that iteration cycle; and iteratively, continue running iteration cycles, until the training error value at an end of an iteration cycle, meets the training predetermined error threshold, resulting in the untrained fusing algorithm being transformed to the trained fusing algorithm, and ending the iterations of the iteration cycles.

Another aspect can include the stored data is accepted via an input interface in communication with the memory and the processor, and that some data stored in the memory is obtained from sensors including at least one LSMS image sensor device and at least one HRPAN image sensor device. Wherein this aspect can further comprise capturing at least one LRMS image via the at least one MS image sensor with a first exposure time; and capturing at least one HRPAN image via the at least one PAN image sensor with a second exposure.

Another aspect can include the LRMS images are obtained from a MS image sensor device optically coupled to a first imaging lens, and the HRPAN images are obtained from a PAN image sensor device optically coupled to a second imaging lens.

Contemplated is that the system, can include any combination of the different aspects listed below, regarding the system, described as an apparatus comprising computer storage comprising a computer-readable storage medium. A hardware processor device operatively coupled to the computer storage and to reconstruct spatial resolution of an image of a scene captured within multi-spectral (MS) image and panchromatic (PAN) image. The MS images obtained from a MS image sensor having a color filter array and positioned at a first optical axis, and the PAN images obtained from a PAN image sensor positioned at a second optical axis that is substantially parallel to the first optical axis. Wherein, to reconstruct the spatial resolution of the image, the hardware processor device is to iteratively, fuse a MS image with an associated PAN image of the scene. Each iteration includes using a gradient descent (GD) approach, to generate an intermediate high-resolution multispectral (IHRMS) image with an increased spatial resolution when compared to the stored MS image. Projecting the IHRMS image using a convolutional neural network (CNN) to obtain an estimated synthesized high-resolution multispectral (ESHRMS) image. Using the ESHRMS image, along with the HRPAN image, as an input to the GD approach, to obtain an updated IHRMS image for each iteration, which is used as an input to the CNN, to obtain an updated ESHRMS image. Generating a fused high-spatial and high-spectral resolution MS image upon processing all of the accepted LRMS images and HRPAN images of the scene, ending the iterations and completing an iteration cycle. An output interface outputs the fused high-spatial and high-spectral resolution MS image to one of, a communication network, to a display device or to be stored in the computer-readable storage medium.

An aspect can include the MS images are low resolution images and are obtained from the MS image sensor optically coupled to a first imaging lens, and the PAN images are high resolution images and are obtained from the PAN image sensor, the MS image sensor and the PAN image sensor have substantially identical focal plane arrays of substantially identical photosensitive elements, and wherein the MS image sensor and the PAN image sensor are set in substantially a single geometric plane such that the focal plane arrays receive optical projections of substantially an identical version of the scene.

An aspect includes the MS images are captured at a first frame rate and the PAN images are captured at a second frame rate different than the first frame rate.

Contemplated is that the system, can include any combination of the different aspects listed below, regarding the system, described as the system for reconstructing a super resolution (SR) image from multispectral (MS) images. The system comprising an input interface to accept data. A memory to store the data, the data including MS images and panchromatic (PAN) images of a scene, each MS image is associated with each PAN image. A hardware processing device operatively connected to the input interface and the memory. The hardware processing device is configured to iteratively, fuse a MS image with an associated PAN image of the scene using a trained fusing algorithm, by a processor. Each iteration includes using a gradient descent (GD) approach, to generate an intermediate high-resolution multispectral (IHRMS) image with an increased spatial resolution when compared to the stored MS image. Projecting the IHRMS image using a convolutional neural network (CNN) to obtain an estimated synthesized high-resolution multispectral (ESHRMS) image. Using the ESHRMS image, along with the HRPAN image, as an input to the GD approach, to obtain an updated IHRMS image for each iteration, which is used as an input to the CNN, to obtain an updated ESHRMS image. Generating a fused high-spatial and high-spectral resolution MS image upon processing all of the accepted LRMS images and HRPAN images of the scene, ending the iterations and completing an iteration cycle. An output interface to output the fused high-spatial and high-spectral resolution MS image to a communication network or to a display device.

An aspect of the system can include the NN configured as a convolutional neural network (CNN) or a part of the NN is configured as a convolutional neural network. An aspect can include the MS images are obtained from a MS image sensor having a color filter array and positioned at a first optical axis and the PAN images are obtained from a PAN image sensor positioned at a second optical axis that converges at an angle with the first optical axis. An aspect can include the data accepted by the input interface includes some data obtained from sensors including at least one MS image sensor device and at least one PAN image sensor device.

Another aspect of the system can be the MS images and the PAN images are obtained from an image capturing device by the processor, the processor is an image processing device, such that at least one MS image and at least one PAN image are both taken of the scene, the at least one MS image is obtained from a MS image sensor having a color filter array and positioned at a first optical axis, and the at least one PAN image is obtained from a panchromatic sensor positioned at a second optical axis that converges at an angle with the first optical axis.

Another aspect of the system can be the data is obtained from sensors including at least one MS image sensor and at least one PAN image sensor. Wherein, an option can further comprise capturing at least one MS image via the at least one MS image sensor with a first exposure time; and capturing at least one PAN image via the at least one PAN image sensor with a second exposure time different than the first exposure time. Another aspect of the method can be further including instructions stored thereon which, when executed by the processor, configure the processor to cause the generated desired SR image to be displayed on a display communicatively coupled to the processor.

An aspect of the system can further include instructions stored thereon which, when executed by a machine, configure the machine to perform operations further to: create the PAN image with about a same resolution as a resolution of the MS image by down-sampling PAN image data or determining the PAN image data from the MS image data. Another aspect of the method can be the instructions to combine PAN image data with MS image data is formulized as an inverse problem to create combined image data that includes instructions to convert the PAN image data and MS image data to vectors which are represented vectorized versions of the PAN image, the MS image and the estimate SHR image.

Figure 7:
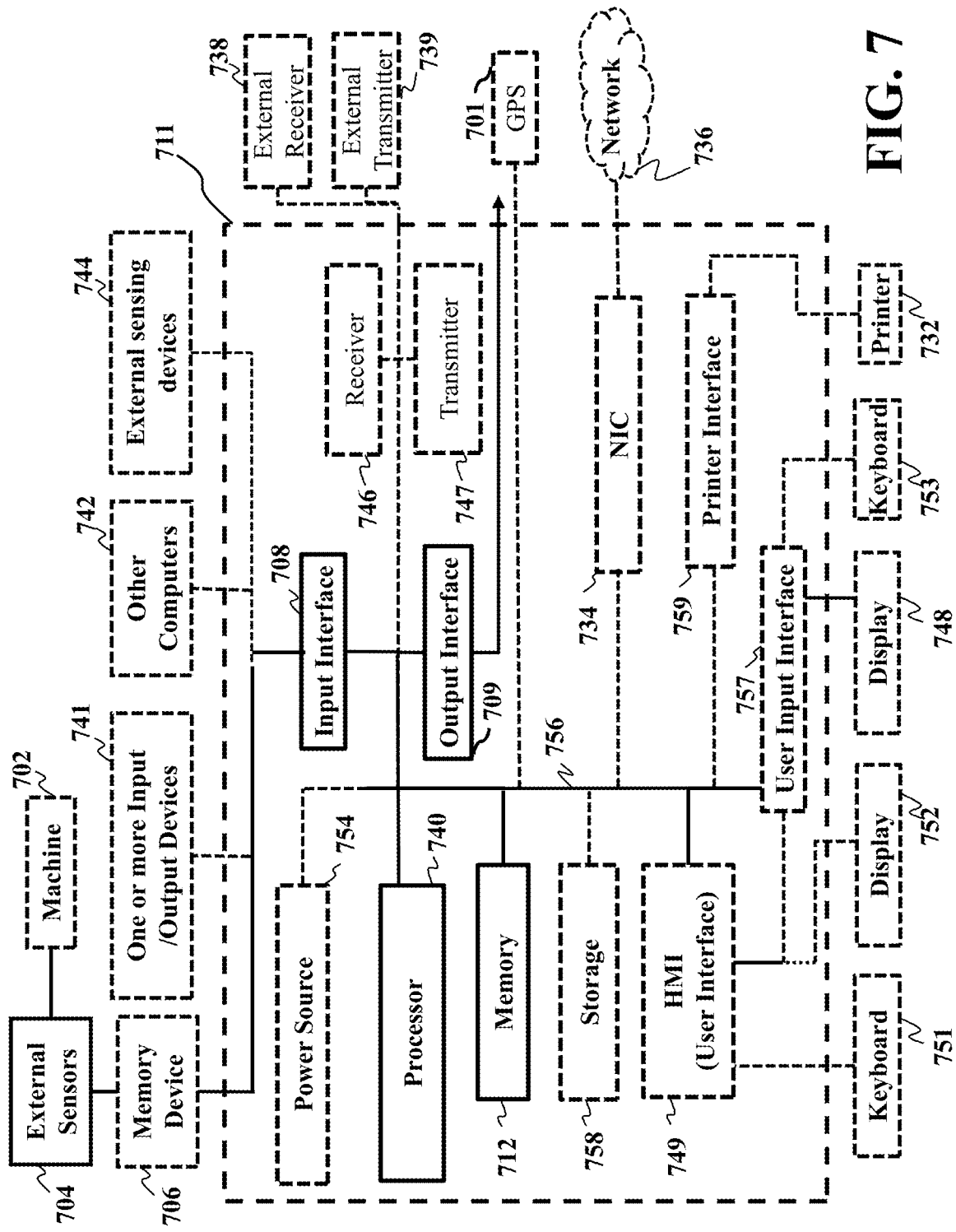
FIG. 7 is a block diagram of illustrating the method of FIG. 1A, that can be implemented using an alternate computer or processor, according to some embodiments of the present disclosure.

FIG. 7 is a block diagram of illustrating the method of FIG. 1A, that can be implemented using an alternate computer or processor, according to embodiments of the present disclosure. The computer 711 includes a processor 740, computer readable memory 712, storage 758 and user interface 749 with display 752 and keyboard 751, which are connected through bus 756. For example, the user interface 764 in communication with the processor 740 and the computer readable memory 712, acquires and stores the image data in the computer readable memory 712 upon receiving an input from a surface, keyboard 753, of the user interface 757 by a user.

The computer 711 can include a power source 754, depending upon the application the power source 754 may be optionally located outside of the computer 711. Linked through bus 756 can be a user input interface 757 adapted to connect to a display device 648, wherein the display device 748 can include a computer monitor, camera, television, projector, or mobile device, among others. A printer interface 759 can also be connected through bus 756 and adapted to connect to a printing device 732, wherein the printing device 732 can include a liquid inkjet printer, solid ink printer, large-scale commercial printer, thermal printer, UV printer, or dye-sublimation printer, among others. A network interface controller (NIC) 734 is adapted to connect through the bus 756 to a network 736, wherein image data or other data, among other things, can be rendered on a third-party display device, third party imaging device, and/or third-party printing device outside of the computer 711. The computer/processor 711 can include a GPS 701 connected to bus 756.

Still referring to FIG. 7, the image data or other data, among other things, can be transmitted over a communication channel of the network 736, and/or stored within the storage system 758 for storage and/or further processing. Further, the time series data or other data may be received wirelessly or hard wired from a receiver 746 (or external receiver 738) or transmitted via a transmitter 747 (or external transmitter 739) wirelessly or hard wired, the receiver 746 and transmitter 747 are both connected through the bus 756. The computer 711 may be connected via an input interface 708 to external sensing devices 744 and external input/output devices 741. The input interface 708 can be connected to one or more input/output devices 741, external memory 706, external sensors 704 which may be connected to a machine-like device 702. For example, the external sensing devices 744 may include sensors gathering data before-during-after of the collected time-series data of the machine. The computer 711 may be connected to other external computers 742. An output interface 709 may be used to output the processed data from the processor 740. It is noted that a user interface 749 in communication with the processor 740 and the non-transitory computer readable storage medium 712, acquires and stores the region data in the non-transitory computer readable storage medium 712 upon receiving an input from a surface 752 of the user interface 749 by a user.

The description provides exemplary embodiments only, and is not intended to limit the scope, applicability, or configuration of the disclosure. Rather, the following description of the exemplary embodiments will provide those skilled in the art with an enabling description for implementing one or more exemplary embodiments. Contemplated are various changes that may be made in the function and arrangement of elements without departing from the spirit and scope of the subject matter disclosed as set forth in the appended claims.

Specific details are given in the following description to provide a thorough understanding of the embodiments. However, understood by one of ordinary skill in the art can be that the embodiments may be practiced without these specific details. For example, systems, processes, and other elements in the subject matter disclosed may be shown as components in block diagram form in order not to obscure the embodiments in unnecessary detail. In other instances, well-known processes, structures, and techniques may be shown without unnecessary detail in order to avoid obscuring the embodiments. Further, like reference numbers and designations in the various drawings indicated like elements.

Also, individual embodiments may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process may be terminated when its operations are completed, but may have additional steps not discussed or included in a figure. Furthermore, not all operations in any particularly described process may occur in all embodiments. A process may correspond to a method, a function, a procedure, a subroutine, a subprogram, etc. When a process corresponds to a function, the function's termination can correspond to a return of the function to the calling function or the main function.

Furthermore, embodiments of the subject matter disclosed may be implemented, at least in part, either manually or automatically. Manual or automatic implementations may be executed, or at least assisted, through the use of machines, hardware, software, firmware, middleware, microcode, hardware description languages, or any combination thereof. When implemented in software, firmware, middleware or microcode, the program code or code segments to perform the necessary tasks may be stored in a machine readable medium. A processor(s) may perform the necessary tasks.

The above-described embodiments of the present disclosure can be implemented in any of numerous ways. For example, the embodiments may be implemented using hardware, software or a combination thereof. When implemented in software, the software code can be executed on any suitable processor or collection of processors, whether provided in a single computer or distributed among multiple computers. Such processors may be implemented as integrated circuits, with one or more processors in an integrated circuit component. Though, a processor may be implemented using circuitry in any suitable format.

Also, the various methods or processes outlined herein may be coded as software that is executable on one or more processors that employ any one of a variety of operating systems or platforms. Additionally, such software may be written using any of a number of suitable programming languages and/or programming or scripting tools, and also may be compiled as executable machine language code or intermediate code that is executed on a framework or virtual machine. Typically, the functionality of the program modules may be combined or distributed as desired in various embodiments.

Also, the embodiments of the present disclosure may be embodied as a method, of which an example has been provided. The acts performed as part of the method may be ordered in any suitable way. Accordingly, embodiments may be constructed in which acts are performed in an order different than illustrated, which may include performing some acts concurrently, even though shown as sequential acts in illustrative embodiments. Further, use of ordinal terms such as first, second, in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

Although the present disclosure has been described with reference to certain preferred embodiments, it is to be understood that various other adaptations and modifications can be made within the spirit and scope of the present disclosure. Therefore, it is the aspect of the append claims to cover all such variations and modifications as come within the true spirit and scope of the present disclosure.

What is claimed is:

1. A method for reconstructing a super resolution (SR) image from multispectral (MS) images, comprising:
  accepting data including low resolution multispectral (LRMS) images and high resolution panchromatic (HRPAN) images of a scene, each LRMS image is associated with a HRPAN image, and storing the data in a memory;
  iteratively, fusing a LRMS image with an associated HRPAN image of the scene using a trained fusing algorithm, by a processor, each iteration includes:
    using a gradient descent (GD) approach, to generate an intermediate high-resolution multispectral (IHRMS) image with a decreased error indicated in an objective cost function;
    projecting the IHRMS image using a convolutional neural network (CNN) to obtain an estimated synthesized high-resolution multispectral (ESHRMS) image;
    using the ESHRMS image, along with the HRPAN image, as an input to the GD approach, to obtain an updated IHRMS image for each iteration, which is used as an input to another CNN, to obtain an updated ESHRMS image; and
    generating a fused high-spatial and high-spectral resolution MS image upon processing all of the accepted LRMS images and HRPAN images of the scene, ending the iterations and completing an iteration cycle; and
  outputting, via an output interface, the fused high-spatial and high-spectral resolution MS image to a communication network or to a display device.

2. The method of claim 1, wherein training of an untrained fusing algorithm prior to obtaining the trained fusing algorithm, includes:
  accepting data including low resolution multispectral (LRMS) images and high resolution panchromatic (HRPAN) images of a scene, each LRMS image is associated with a HRPAN image, and storing the data in a memory;
  iteratively, fusing a LRMS image with an associated HRPAN image of the scene using a trained fusing algorithm, by a processor, each iteration includes:
    using a gradient descent (GD) approach, to generate an intermediate high-resolution multispectral (IHRMS) image with a decreased error indicated in an objective cost function;
    projecting the IHRMS image using a convolutional neural network (CNN) to obtain an estimated synthesized high-resolution multispectral (ESHRMS) image;
    using the ESHRMS image, along with the HRPAN image, as an input to the GD approach, to obtain an updated IHRMS image for each iteration, which is used as an input to another CNN, to obtain an updated ESHRMS image;
    generating a fused high-spatial and high-spectral resolution MS image upon processing all of the accepted LRMS images and HRPAN images of the scene, ending the iterations and completing a training iteration cycle;
  determining a training error value indicated in a training objective cost function, upon completion of each training iteration cycle;
  comparing the training error value to a training predetermined error threshold, if the training error value meets the training predetermined error threshold, the untrained fusing algorithm is transformed to the trained fusing algorithm, if the training error value does not meet the training predetermined error threshold, and then
  adjusting parameters of a training GD (TGD) and parameters of multiple training CNNs (TCNNs) of the training fusing algorithm, wherein parameters for each TCNN of the multiple TCCNs are different, such that adjusted parameters of the TGD and each of the multiple TCNNs are to minimize the training error value, for that iteration cycle.

3. The method of claim 1, wherein training an untrained fusing algorithm prior to obtaining the trained fusing algorithm, includes determining a training error value indicated in a training objective cost function, after completion of each training iteration cycle, and adjusting parameters of a training GD (TGD) and parameters of each training CNN (TCNN) of multiple TCNNs, of the training fusing algorithm, to minimize the training error value for a next iteration cycle, and ending the training iterations when meeting a training predetermined error threshold or a predetermined number of training iterations, to transform the untrained fusing algorithm to the trained fusing algorithm.

4. The method of claim 3, wherein the training error value is determined based on comparing between a training fused high-spatial and high-spectral resolution multispectral image and a training desired super resolution multispectral image stored in a training memory.

5. The method of claim 3, wherein a training iteration cycle is completed after processing all training low resolution multispectral images and training high resolution panchromatic images of different training scenes.

6. The method of claim 3, wherein the parameters of the GD include the forward operator A, and the parameters of the CNN include a set of filters, such as a set of convolutional kernels.

7. The method of claim 3, wherein the training predetermined error threshold is stored in a training memory, such that an operator obtains the training predetermined error threshold from two or more training predetermined error thresholds stored in the training memory.

8. The method of claim 1, wherein training an untrained fusing algorithm prior to obtaining the trained fusing algorithm, includes the steps of:
  accepting training data in a training memory, the training data including at least one training desired super resolution multispectral (TDSRMS) image, training low resolution multispectral (TLRMS) images and training high resolution panchromatic (THRPAN) images of a training scene, each TLRMS image is associated with a THRPAN image;
  iteratively, fusing a TLRMS image with an associated THRPAN image of the training scene using an untrained fusing algorithm, by a training processor, each training iteration including:
    using a training gradient descent (TGD) approach, to generate a training intermediate high-resolution multispectral (TIHRMS) image that has an increased spatial resolution, and a smaller error to the TDSRMS image when compared to the stored TLRMS image;

projecting the TIHRMSS image using a training convolutional neural network (TCNN) to obtain a training estimated synthesized high-resolution multispectral (TESHRMS) image, for a first iteration;

using the TESHRMS image, along with the THRPAN image, as an input to the TGD approach for a second iteration and following iterations, to obtain an updated TIHRMS image, which is used as an input to the TCNN for the iteration and following iterations, to obtain an updated TESHRMS image;

generating a training fused high-spatial and high-spectral resolution multispectral image upon processing all of all the TLRMS images and THRPAN images of the scene;

determining an error between the training fused high-spatial and high-spectral resolution multispectral image and the stored DSRMS image, to obtain a training error value indicated in a training objective cost function;

comparing the training error value to a training predetermined error threshold, if the training error value meets the training predetermined error threshold, the untrained fusing algorithm is transformed to the trained fusing algorithm, if the training error value does not meet the training predetermined error threshold, then parameters of the TGD and TCNN are updated to minimize the training error value, for that iteration cycle; and iteratively, continue running iteration cycles, until the training error value at an end of an iteration cycle, meets the training predetermined error threshold, resulting in the untrained fusing algorithm being transformed to the trained fusing algorithm, and ending the iterations of the iteration cycles.

9. The method of claim 1, wherein the method is an unrolled projected gradient descent method, and the stored data is accepted via an input interface in communication with the memory and the processor, and that some data stored in the memory is obtained from sensors including at least one LSMS image sensor device and at least one HRPAN image sensor device.

10. The method of claim 9, further comprising:
capturing at least one LRMS image via the at least one MS image sensor with a first exposure time; and
capturing at least one HRPAN image via the at least one PAN image sensor with a second exposure time different than or the same as the first exposure time.

11. The method of claim 1, wherein the LRMS images are obtained from a MS image sensor device optically coupled to a first imaging lens, and the HRPAN images are obtained from a PAN image sensor device optically coupled to a second imaging lens.

12. An apparatus comprising:
computer storage comprising a computer-readable storage medium; and
a hardware processor device operatively coupled to the computer storage and to reconstruct spatial resolution of an image of a scene captured within multi-spectral (MS) image and panchromatic (PAN) image, the MS images obtained from a MS image sensor having a color filter array and positioned at a first optical axis, and the PAN images obtained from a PAN image sensor positioned at a second optical axis that is substantially parallel to the first optical axis, wherein, to reconstruct the spatial resolution of the image, the hardware processor device is to:

iteratively, fuse a MS image with an associated PAN image of the scene, each iteration includes:
using a gradient descent (GD) approach, to generate an intermediate high-resolution multispectral (IHRMS) image with a reduced error according to the objective cost function;
projecting the IHRMS image using a convolutional neural network (CNN) to obtain an estimated synthesized high-resolution multispectral (ESHRMS) image;
using the ESHRMS image, along with the HRPAN image, as an input to the GD approach, to obtain an updated IHRMS image for each iteration, which is used as an input to the CNN, to obtain an updated ESHRMS image; and
generating a fused high-spatial and high-spectral resolution MS image upon processing all of the accepted LRMS images and HRPAN images of the scene, ending the iterations and completing an iteration cycle; and an output interface outputs the fused high-spatial and high-spectral resolution MS image to one of, a communication network, to a display device or to be stored in the computer-readable storage medium.

13. The apparatus of claim 12, wherein the MS images are low resolution images and are obtained from the MS image sensor optically coupled to a first imaging lens, and the PAN images are high resolution images and are obtained from the PAN image sensor, the MS image sensor and the PAN image sensor have substantially identical focal plane arrays of substantially identical photosensitive elements, and wherein the MS image sensor and the PAN image sensor are set in substantially a single geometric plane such that the focal plane arrays receive optical projections of substantially an identical version of the scene.

14. The apparatus of claim 12, wherein the MS images are captured at a first frame rate and the PAN images are captured at a second frame rate different than or the same as the first frame rate.

15. A system for reconstructing a super resolution (SR) image from multispectral (MS) images, the system comprising:
an input interface to accept data;
a memory to store the data, the data including MS images and panchromatic (PAN) images of a scene, each MS image is associated with a PAN image;
a hardware processing device operatively connected to the input interface and the memory, the hardware processing device is configured to:
iteratively, fuse a MS image with an associated PAN image of the scene using a trained fusing algorithm, by a processor, each iteration includes:
using a gradient descent (GD) approach, to generate an intermediate high-resolution multispectral (IHRMS) image with an increased spatial resolution when compared to the stored MS image;
projecting the IHRMS image using a convolutional neural network (CNN) to obtain an estimated synthesized high-resolution multispectral (ESHRMS) image; and
using the ESHRMS image, along with the HRPAN image, as an input to the GD approach, to obtain an updated IHRMS image for each iteration, which is used as an input to the CNN, to obtain an updated ESHRMS image;

generating a fused high-spatial and high-spectral resolution MS image upon processing all of the accepted LRMS images and HRPAN images of the scene, ending the iterations and completing an iteration cycle; and an output interface to output the fused high-spatial and high-spectral resolution MS image to a communication network or to a display device.

16. The system of claim 15, wherein the NN is configured as a convolutional neural network (CNN) or a part of the NN is configured as the CNN.

17. The system of claim 15, wherein the MS images are obtained from a MS image sensor having a color filter array and positioned at a first optical axis and the PAN images are obtained from a PAN image sensor positioned at a second optical axis that converges at an angle with the first optical axis.

18. The of claim 15, wherein the data accepted by the input interface includes some data obtained from sensors including at least one MS image sensor device and at least one PAN image sensor device.

19. A non-transitory machine-readable medium including instructions stored thereon which, when executed by processing circuitry, configure the processing circuitry to perform operations to sharpen a multi-spectral (MS) image using data from a panchromatic (PAN) image, the operations to:

iteratively, fusing a LRMS image with an associated HRPAN image of the scene using a trained fusing algorithm, by a processor, each iteration includes:

using a gradient descent (GD) approach, to generate an intermediate high-resolution multispectral (IHRMS) image with an increased spatial resolution when compared to the stored MS image;

projecting the IHRMS image using a convolutional neural network (CNN) to obtain an estimated synthesized high-resolution multispectral (ESHRMS) image; and using the ESHRMS image, along with the HRPAN image, as an input to the GD approach, to obtain an updated IHRMS image for each iteration, which is used as an input to the CNN, to obtain an updated ESHRMS image;

generating a fused high-spatial and high-spectral resolution MS image upon processing all of the accepted LRMS images and HRPAN images of the scene, ending the iterations and completing an iteration cycle; and outputting, using a transceiver, the fused high-spatial and high-spectral resolution MS image to a communication network or to store in the memory.

20. The non-transitory machine-readable medium of claim 19, further including instructions stored thereon which, when executed by a machine, configure the machine to perform operations further to: create the PAN image with about a same resolution as a resolution of the MS image by down-sampling PAN image data or determining the PAN image data from the MS image data.

21. The non-transitory machine-readable medium of claim 19, wherein the instructions to combine PAN image data with MS image data is formulized as an inverse problem to create combined image data that includes instructions to convert the PAN image data and MS image data to vectors which are represented vectorized versions of the PAN image, the MS image and the ESHRMS image.

* * * * *